O. H. DE LAPOTTERIE.
METAL WORKING MACHINE.
APPLICATION FILED APR. 20, 1918.
1,341,808.
Patented June 1, 1920.
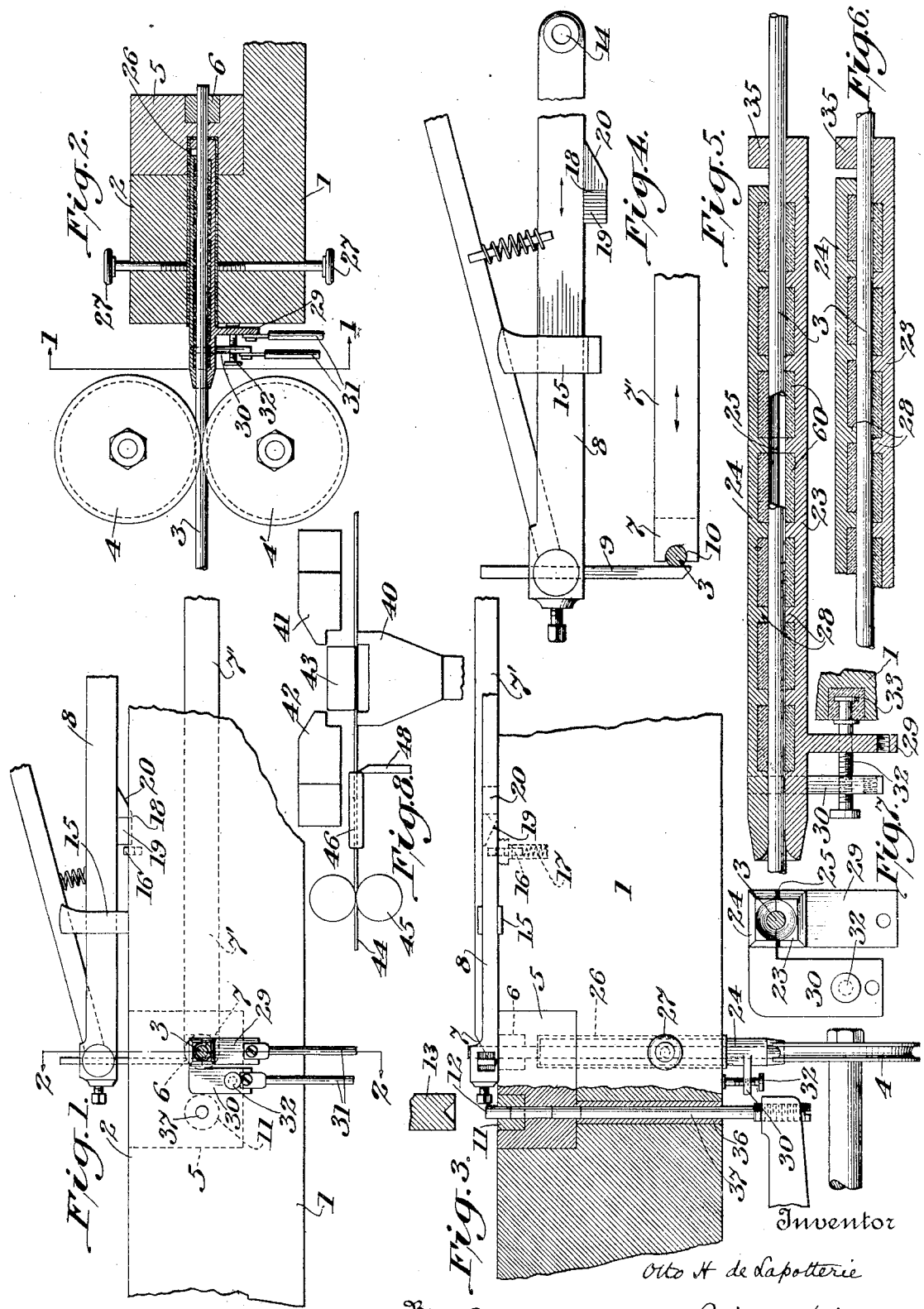

ced, too faded/low-resolution to read.

UNITED STATES PATENT OFFICE.

OTTO H. DE LAPOTTERIE, OF NEW BRIGHTON, PENNSYLVANIA, ASSIGNOR TO TOWNSEND COMPANY, OF NEW BRIGHTON, PENNSYLVANIA.

METAL-WORKING MACHINE.

1,341,808.  Specification of Letters Patent.  Patented June 1, 1920.

Application filed April 20, 1918. Serial No. 229,821.

*To all whom it may concern:*

Be it known that I, OTTO H. DE LAPOTTERIE, a citizen of the United States, residing at New Brighton, in the county of Beaver and State of Pennsylvania, have invented certain new and useful Improvements in Metal-Working Machines, of which the following is a specification.

The present invention relates generally to apparatus for forming articles from metal stock, such as a bar, strip, rod or sheet by forging, upsetting or other like operations involving the flow of metal.

It is the general object of the invention to produce heated blanks to be operated upon by suitable pressure means to form a metal article.

Another object is to produce blanks to be operated upon by means for changing the form and texture of a portion of the blank and to heat so much of the blank only as is subject to such change.

Other objects will appear from the detailed description of a specific structural arrangement which is fairly illustrative of the principles upon which the invention is based. The scope of the invention will be more particularly pointed out in the appended claims.

In the drawings which form a part of the specification,—

Figure 1 is an end view of a single blow apparatus, back of plane 1—1 on Fig. 2.

Fig. 2 is a vertical section along line 2—2 in Fig. 1;

Fig. 3 is a plan view, a part being shown in section;

Fig. 4 a view showing certain detail in elevation;

Fig. 5 a vertical section through the electrical heating apparatus;

Fig. 6 a fragmentary sectional view similar to Fig. 5, but showing the heating device in a differently adjusted position;

Fig. 7 an end view of the electrical heating apparatus; and

Fig. 8 is a schematic view of a three blow machine embodying the invention.

In the drawings, 1 represents the bed plate of the machine which may be carried upon any suitable frame. This bed plate has an upwardly projecting portion 2 through which the stock 3 is fed by rolls 4 and 4' to the forging or shaping mechanism to be presently described. 5 is a die block in which is embedded the cutting off die 6 having its working face flush with the face of the die block. A cutter tool 7 is mounted on a tool carrier 7' for movement transversely of the cutting off die 6 to cut off the protruding end of the stock. Above the cutter tool 7 is mounted for movement transversely of the cutting off die an arm 8 carrying a finger 9. As shown particularly in Fig. 4, the cutter tool 7 has a shearing edge 10 shaped to embrace about one-half of the stock 3. The arm 8 is mounted for movement with the cutter tool 7 and for that reason may be connected directly or indirectly to the cutter tool. The finger 9 is positioned to normally engage the side of the stock opposite the cutter tool and grip it during the cutting operation and the transfer of the blank cut off from the stock to a shaping or forging mechanism positioned a short distance from the cutting off die.

The blank 12 cut off by the cutter tool 7 is carried over into alinement with an opening in the stationary shaping die 11 and then subsequently shaped by aid of the movable shaping die 13 which may have any desired shape and be mounted in any suitable manner for reciprocal movement toward and away from the stationary shaping die which also may have any desired shape. The arm 8 is pivotally connected to its supporting structure, as indicated by the pivot aperture 14. The pivotal connection, which is not shown, may be a common hinge connection allowing the arm 8 to swing through a definite angle, but keep it normally spaced from the cutter tool so as to assume a definite gripping position, as indicated in Fig. 4.

As soon as the movable shaping die 13 bears down upon the blank 12 to shape it and the blank is forced by the initial movement of the die 13 into the stationary shaping die 11, the cutter tool 7 and the arm 8 are withdrawn to provide clearance for the shaping operation. In order to remove the finger 9 out of the range of the movable shaping die, the following provision is made:

In the portion 2 of the bed plate is seated a pin 16 actuated by a spring 17 to normally project beyond the face of the portion 2. The arm 8 carries a composite cam element 18. This element 18 has a cam surface 19 facing the pin and a cam surface 20 at its trailing end when the cutter tool is moved to the left in Figs. 1, 3 and 4. As the cutter tool 7 and arm 8 move to the left to cut the rod and transfer the blank to the shaping dies, the cam face 19 passes over the pin to force it inwardly. When the element 18 has just passed the pin, the latter will be forced out again behind the cam surface 20 and engage the arm 8 on its back-stroke. The pin 16 and the cam face 20 are so related that as soon as the arm 8 starts on its back stroke, the cam face 20 will ride up on the pin 16 and the finger 9 is raised away from the blank and the movable shaping die outwardly and upwardly a sufficient distance to clear the latter. When the element 18 has passed the pin 16, the arm 8 falls again to its normal position.

By suitable translating mechanism the stock 3 is fed forwardly a definite distance to bring a new length of stock before the cutter tool.

Such translating devices and the movements of the cutter tool 7 and arm 8 can be suitably regulated and adjusted that the finger 9 will resume its gripping position when the cutter tool has reached its normal position prior to its cutting operation and when the stock 3 has been advanced. The construction, operation, timing and regulating of translating devices of this kind are well known and understood. A guide post 15, attached to the bed plate 1 or portion 2 guides the arm 8 in its angular motion and at the same time limits its downward motion. The mechanism thus far described is, in the main, well known in the art.

The principal part of my invention consists in the electrical mechanism for heating the blank to the proper temperature for the shaping operation. The stock 3 is fed through a guide quill mounted in a bore or channel in the portion 2 of the bed plate 1. This quill is made of two separate parts 23 and 24 which are electrically insulated from each other and from the portion 2 by insulating layers 25 and 26 respectively. Set screws 27 extend through the bed plate from opposite sides to hold the parts 23 and 24 in mechanical contact and at the same time admit of an adjustment of the quill as a whole relatively to the die block 5. The parts 23 and 24 constitute electrodes of opposite sign. Each of these electrodes has a plurality of spaced contacts 28 formed to correspond to the shape of the stock. As shown, the contacts are formed as stationary ribs over which the stock moves, but they may be formed as rolls or wheels. The intervening spaces are preferably taken up by porcelain shells 60 capable of withstanding a high temperature. The electrodes have connecting terminals 29 and 30 adapted to receive the leads 31 from a source of electrical current. Provisions are made to adjust one electrode axially relatively to the other, as indicated in Figs. 5 and 6. A screw 32 may be anchored for swivel motion in an insulator block 33 secured in a recess in the bed plate 1 and have screw threaded engagement with lug or terminal 30. By turning the screw 32 in one direction or the other, the electrode 24 is moved forwardly or rearwardly respectively. In this manner the ribs 28 of the electrodes are placed in staggered relation, as indicated in Fig. 6 and greater portions of the stock 3 are heated by the current in its passage from one electrode to the other. While the electrodes may be adjusted to heat any desired length and even the whole length of stock 3 within the quill, the device is primarily designed to heat only certain portions of the stock and leave the intermediate portions relatively cool. It is heated portions to suit particular requirements. One of the electrodes, in the particular case shown the electrode 23 terminates at the end near the die block in a complete collar or ring 35 which serves as a guiding element to insure alinement with the die block.

Parallel to the heating quill is a bore 36 in alinement with the stationary shaping die 11. A plunger rod 37 connected to a pivoted lever 38 extends into this bore and serves to eject the shaped metal article from the stationary shaping die 11. For the purpose of adjusting the length of the portion of the blank projecting from the shaping die 11, filler blanks may be interposed between the plunger 37 and the blank 12. Suitable translating mechanism (not shown), such as a cam, may be correlated with the other mechanism to accurately time the ejecting action of the plunger 37, such knockout mechanism being common in the art.

The layer 26 around the quill may be of a material which is not only an electrical insulator, but also a heat insulator so as to minimize dissipation of heat from the rod.

The operation of the device described is apparent. The feeding of the stock 3, the motion of the cutter tool 7, arm 8 together with finger 9, which is preferably in the form of a spring blade, of the movable shaping die 13, and the ejecting plunger 37 through the stationary shaping die 11 are all accurately timed to perform in the proper sequence the respective operations described. The electrodes 23 and 24 are adjusted to heat spaced portions of definite length of the stock 3. The stock 3 is advanced successively a predetermined distance according to the length of the blank desired and the ribs 28 are spaced to correspond with the length of the blank. During the successive steps of feeding the stock, definite portions of the stock are repeatedly heated by the current according to the number of ribs on the electrodes. As each gradually heated portion advances to the last pair of ribs 28 it is given the final heating which brings it to a suitable temperature for forging or shaping. The arrangement is such that the stock is sheared immediately in advance of each heated portion so that the heated end of the cut-off blank is presented to the movable shaping die while the relatively cool portion of the blank is contained within the stationary shaping die. Since the time required for a cycle of operation is very short, there is no appreciable cooling of the blank.

Having reference to Fig. 8, 40, 41 and 42 represent shaping tools and 43 a stationary shaping die coöperating with the movable shaping tools to produce a shaped metal article. The stock 44 is fed by rolls 45 through the heating mechanism 46 which is of the construction shown in Figs. 2, 5, 6 and 7. As the stock passes through the heating mechanism 46, it is heated up and when it arrives at its predetermined position between the stationary die and the movable shaping tools, it is in the proper condition for shaping. In this device the length of the blank to be separated is considerably longer than the heating device and the whole length blank must be heated during its passage through the heating device. The movable electrode 24 is so adjusted that its ribs 28 are disposed midway between the ribs 28 of the electrode 23. In this manner the current passes through every portion of that length of the blank 47 which lies within the quill or heating mechanism 46. The cutter tool 48 is operated at the moment when the stock 44 has reached its final position as indicated in Fig. 8. Almost simultaneously with the cutting of the blank the dies are set in operation to perform the shaping function. After the blank is shaped the dies are brought back into their original position, the article removed and the whole cycle repeated. It is understood that the length of the heating apparatus may be varied to suit particular conditions.

In the foregoing, I have confined myself to the description of a specific form of single blow machine containing only two shaping tools and indicate schematically the application of the invention to a triple blow machine carrying four shaping tools. It is obvious that the invention can be equally well embodied in machines for treating other forms of stock, and for operating on the heated blanks in different ways and for producing other metal articles. The scope of the invention comprises all apparatus in which stock material is electrically heated, a heated blank severed from the stock and then worked or shaped.

While I have described various detail structures for carrying out the invention, such structural features are merely intended to facilitate the understanding of the invention and to afford a general appreciation of the principles upon which the invention is based. The various details may be radically changed within the broader aspect of the invention as outlined.

I claim:—

1. In a machine for forming small articles from metal stock the combination of means for heating a small portion of the stock, means for severing the heated portion from the stock and pressure means for shaping the heated portion.

2. In a machine for forming articles from metal stock, the combination of means for heating a small portion of the stock, means for severing from the stock a blank including the heated portion and pressure means for shaping the heated portion.

3. In a machine for forming articles from metal stock, the combination of means for electrically heating a small portion of the stock, means for severing the heated portion from the stock and pressure means for shaping the heated portion.

4. In a machine for forming articles from metal stock, the combination of means for electrically heating a small portion of the stock, means for severing from the stock a blank including the heated portion and pressure means for shaping the heated portion.

5. In a machine for forming articles from metal stock, the combination of electrical means for applying heat to a relatively small portion of the stock and means for severing the stock immediately adjacent to the heated portion at one side thereof and a distance from the heated portion at the other side thereof.

6. In a machine for forming metal articles, the combination of means for feeding metal stock from which the article is to be formed, means for heating the stock at definitely spaced points and means for severing the stock adjacent to such points.

7. In a machine for forming metal articles, the combination of means for feeding metal stock from which the article is to be formed, electrical means for heating the stock at definitely spaced points and means for severing the stock adjacent to such points.

8. In a machine for forming metal articles, the combination of means for feeding metal stock from which the article is to be formed, means for simultaneously heating the stock at a plurality of definitely spaced points and means for successively severing the stock adjacent to such points.

9. In a machine for forming metal articles, the combination of means for feeding metal stock from which the article is to be formed, electrical means for simultaneously heating the stock at a plurality of definitely spaced points and means for successively severing the stock adjacent to such points.

10. In a machine for forming metal articles, the combination with metal stock from which the article is to be made, of means for simultaneously heating the stock at a plurality of definitely spaced points, means for successively advancing the stock a distance equal to said spacing and means for successively severing the stock adjacent to said points.

11. In a machine for forming metal articles, the combination with metal stock from which the article is to be made, of a support, electrical means for simultaneously heating the stock at a plurality of definitely spaced points, means for successively advancing the stock a distance equal to said spacing and means for successively severing the stock adjacent to said points.

12. In a machine for forming metal articles, the combination of means for feeding metal stock from which the article is to be formed, means for heating the stock at a plurality of spaced points and means for determining the length of the stock to be heated adjacent each point.

13. In a machine for forming metal articles, the combination of means for feeding metal stock from which the article is to be formed, means for heating the stock at a plurality of points to produce alternately hot and relatively cool portions and means for determining the ratio of the hot and cool portions.

14. In a machine for forming articles from metal stock, the combination of a support, electrodes of substantially semi-cylindrical form surrounding the stock to form a guide quill, said electrodes having longitudinally spaced ribs defining intervening spaces.

15. In a machine for forming articles from metal stock, the combination of a support, electrodes surrounding the stock to form a guide quill, said electrodes having longitudinally spaced ribs defining intervening spaces, and means for shifting one electrode axially relatively to the other.

16. In a machine for forming shaped articles from metal stock, the combination of a support, means for feeding the stock, means for electrically heating a small portion of the stock, means for severing the heated portion from the stock and means for shaping the severed portion.

17. In a machine for forming articles from metal stock, the combination of a support, means for feeding the stock, means for electrically heating a small portion of the stock, means for severing from the stock a blank including the heated portion and means for upsetting the heated portion to form a shaped metal article.

18. In a machine for forming shaped metal articles, the combination of means for electrically heating a small portion of the stock, cutting off mechanism, means for feeding stock to the cutting off mechanism, forging mechanism, and means for transferring the cut-off heated blank from the cutting off mechanism to the forging mechanism.

19. The method of making small articles from metal stock, which consists in heating a small portion of the stock, severing the heated portion from the stock and shaping it.

20. The method of making articles from metal stock, which consists in heating a small portion of the stock, severing from the stock a blank including the heated portion and then shaping the heated portion.

21. The method of making metal articles which consists in electrically heating a small portion of the stock from which the article is to be made, severing the heated portion from the stock and then shaping it.

22. The method of making metal articles which consists in electrically heating a portion of the stock from which the article is to be made, severing from the stock a blank including the heated portion and then shaping the blank.

23. The method of making metal articles, which consists in locally heating a portion of the stock, severing the stock in advance of the heated portion, severing it a distance behind the heated portion and then bringing pressure to bear on the heated portion to shape it.

24. The method of making metal articles, which consists in locally heating a portion of the stock, simultaneously severing it in advance of the heated portion, severing it a distance from the heated portion and then bringing pressure to bear on the heated portion to shape it.

25. The method of making metal articles, which consists in feeding stock, locally heating in successive steps a portion of successive lengths of the stock, severing the stock in advance of the heated portions and bringing pressure to bear on the heated portion of each length to shape it.

In testimony whereof I affix my signature.

OTTO H. DE LAPOTTERIE.